United States Patent
Westerman

(10) Patent No.: US 6,176,539 B1
(45) Date of Patent: Jan. 23, 2001

(54) SUN VISOR EXTENSION

(76) Inventor: Joann M. Westerman, 8740 W. Greenbrian Dr., Peoria, AZ (US) 85382

( * ) Notice: Under 35 U.S.C. 154(b), the term of this patent shall be extended for 0 days.

(21) Appl. No.: 09/464,601

(22) Filed: Dec. 15, 1999

(51) Int. Cl.[7] .................................................. B60J 3/02
(52) U.S. Cl. ....................... 296/97.6; 296/97.1; 296/97.4; 296/97.5; 296/97.8; 296/97.9
(58) Field of Search ................... 296/97.6, 97.1, 296/97.4, 97.5, 97.8, 97.9

(56) References Cited

U.S. PATENT DOCUMENTS

| | | |
|---|---|---|
| 2,238,981 | 4/1941 | Newell . |
| 2,793,072 * | 5/1957 | Lowe ................................ 296/97.6 |
| 2,842,395 | 7/1958 | Davis . |
| 4,690,451 | 9/1987 | Killar . |
| 4,792,176 | 12/1988 | Karford . |
| 5,098,149 | 3/1992 | Lee . |
| 5,165,748 | 11/1992 | O'Connor . |
| 5,259,657 | 11/1993 | Arendt et al. . |
| 5,306,065 * | 4/1994 | Ades ................................. 296/97.6 |
| 5,445,427 | 8/1995 | Vandagriff . |
| 5,730,484 | 3/1998 | Robinson . |
| 5,749,618 | 5/1998 | Jones . |
| 5,882,059 | 3/1999 | Romero . |
| 5,921,607 | 7/1999 | Brooks, II et al. . |
| 6,059,347 * | 5/2000 | Davalos ............................ 296/97.6 |

FOREIGN PATENT DOCUMENTS

| | | | |
|---|---|---|---|
| 3421850 * | 6/1984 | (DE) | ................................... 296/97.6 |
| 2094248 * | 9/1982 | (GB) | ................................... 296/97.6 |
| 2173461 | 10/1986 | (GB) . | |
| 2271329 * | 4/1994 | (GB) | ................................... 296/97.6 |
| WO 90/06241 | 6/1990 | (WO) . | |

* cited by examiner

Primary Examiner—Joseph D. Pape
Assistant Examiner—Mickki D. Murray
(74) Attorney, Agent, or Firm—Frank J. McGue

(57) ABSTRACT

A sun visor extension is adapted for in connection with an existing sun visor of a vehicle. The sun visor extension comprises a body having a generally rectangular shape and two wings foldably connected to and extending along opposing long sides of the body. The width of the wings is less than that of the body. In addition, the wings are adapted to be folded towards each other to a juxtaposed position abutting the body thereby creating an open ended cavity having the length and width of body. An extension is slidably received within the cavity. The extension is a rectangular shape whose length corresponds to that of the body and whose width is narrower than that of the body. The extension is frictionally retained within the cavity by the wings and the body. The sun visor extension is removably attached to a sun visor.

12 Claims, 2 Drawing Sheets

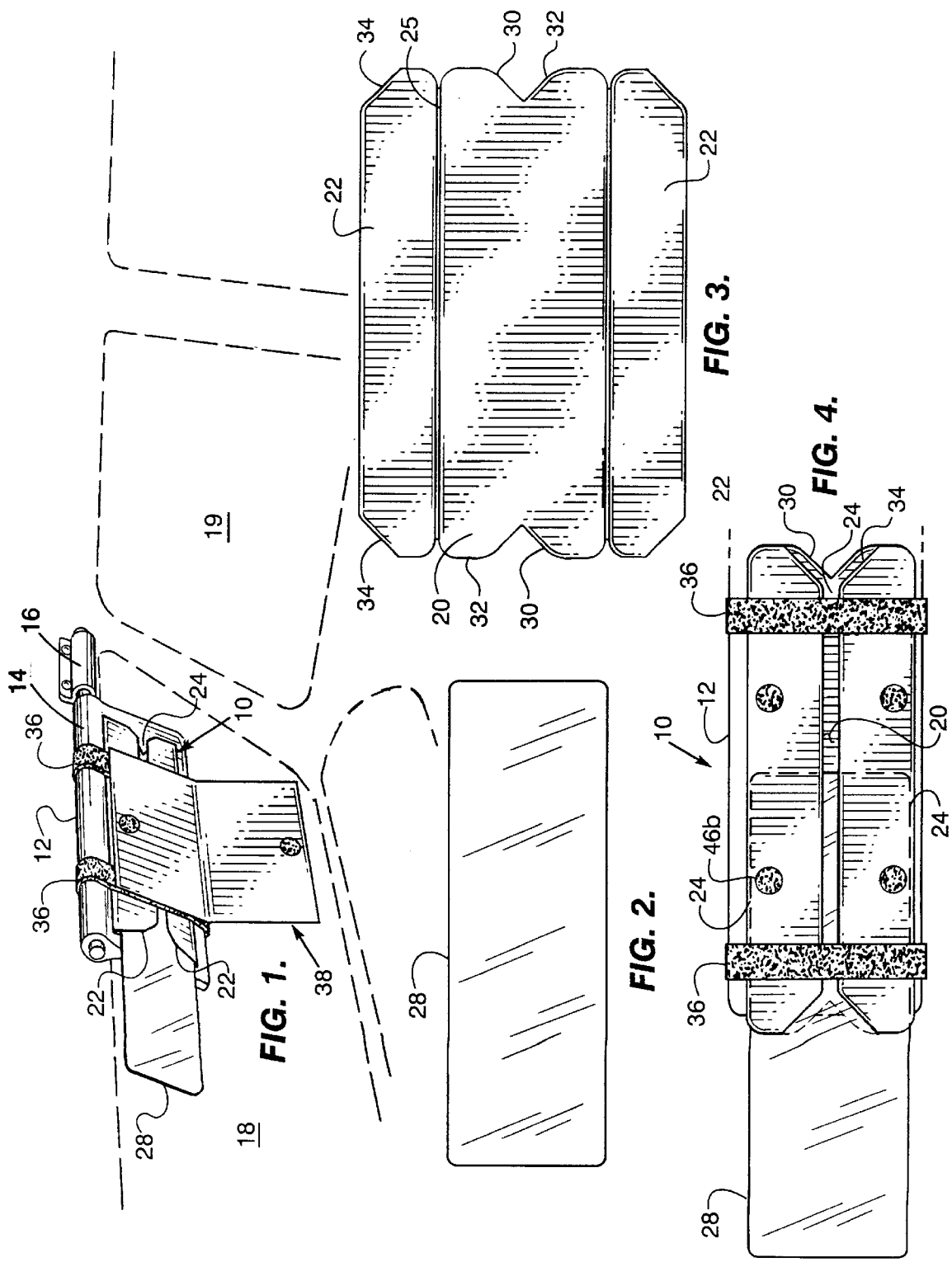

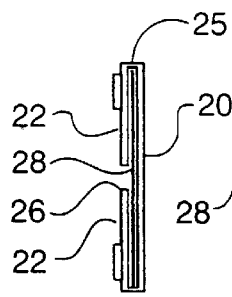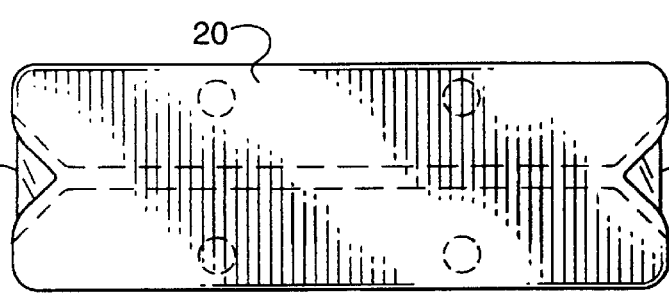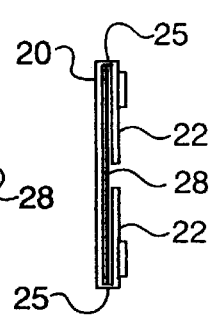
FIG. 5.  FIG. 6.  FIG. 7.
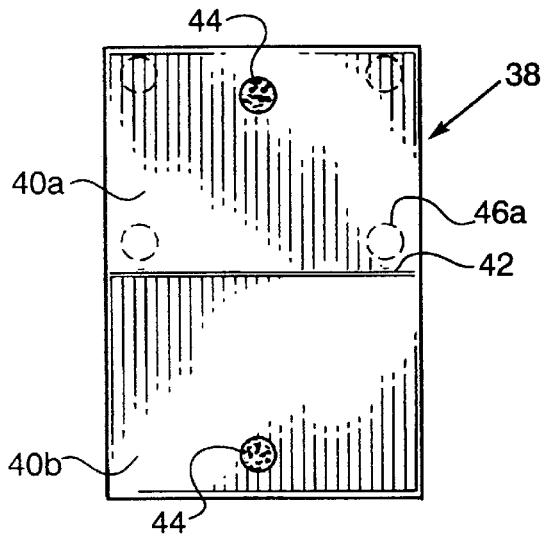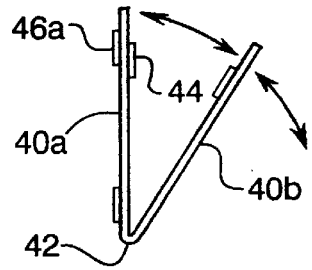
FIG. 8.  FIG. 9.
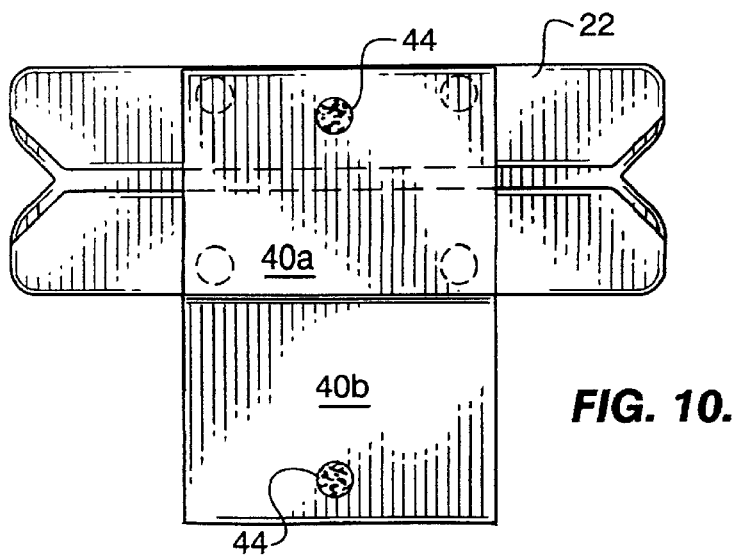
FIG. 10.

SUN VISOR EXTENSION

TECHNICAL FIELD

This invention relates to sun visor extensions, and, more particularly, to a sun visor extension which is easily manufactured, disposable and easily attachable and detachable from a visor of a vehicle.

BACKGROUND OF THE INVENTION

Sun visors are arranged across a windshield to provide shielding to occupants of a vehicle from the glare of the sun. However, often such visors do not cover enough area to provide sufficient protection. Thus, it is desirable to retrofit visors with extensions, both vertical and opposing lateral directions, to augment the protection provided with the original equipment sun visors.

Various types of sun visor extensions have been described in the patent literature.

U.S. Pat. No. 4,792,176 entitled "Extension Unit for Sun Visor" which issued on Dec. 20, 1988 to Karford discloses an extension unit for a sun visor that is releasably attachable to the conventional sun visor of a car. The unit may extend in either lateral direction and is attached to the existing sun visor by way of hook and loop fasteners 70 and 71.

U.S. Pat. No. 2,238,981 entitled "Screen Structures" which issued on Apr. 22, 1941 to Newell discloses a screen held in a retracted position by a button fastener 26. When released, the screen extends to a vertical screening position. Note FIG. 10.

U.S. Pat. No. 5,921,607 entitled "Vehicle Sun Visor Extension" which issued on Jul. 13, 1999 to Brooks, II et al. discloses a sun visor extension having an extension member 22 which moves relative to a base 20. The base is attached to an existing visor by a clip portion 60 but may be attached using Velcro, see Col. 4, lines 13–20.

U.S. Pat. No. 2,842,395 entitled "Sun Visor Extension" which issued on Jul. 8, 1958 to Davis shows a sun visor extension comprising a sleeve member which is attached to a visor. Extension member 26 may be swung o the hinge 27 to the adjusted position.

PCT Pat. No. WO 90/06241 entitled "Angular Sun Visor for Vehicles" is cited to show a pivoted sun visor that is held in its retracted position by way of hook and loop fasteners 5.

U.S. Pat. No. 5,098,149 entitled "Retractable Windshield Shade" which issued on Mar. 24, 1992 to Lee shows hook and loop fasteners 7 on strap 6.

None of the known prior art disclose the device set forth herein.

SUMMARY OF THE INVENTION

It is an object of this invention to provide an improved sun visor extension by the ability to be mounted and removed from an existing sun visor, folded for storage, easily manufactured and disposable.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a perspective view of the present invention attached to a sun visor;

FIG. 2 is a front view of an extension used in the present invention;

FIG. 3 is a front view of a folder in an open position used in the present invention;

FIG. 4 is a front view of the invention showing the extension extending from one side of the assembled invention;

FIG. 5 is a right side view of the assembled invention;

FIG. 6 is a rear view of the assembled invention;

FIG. 7 is a left side view of the assembled invention;

FIG. 8 is a front view of a foldable extender used in connection with the present invention;

FIG. 9 is a side view of the foldable extender; and

FIG. 10 is a front view of the assembled invention having the foldable extender in an open position.

DESCRIPTION OF THE PREFERRED EMBODIMENT

Referring more particularly to the drawings by characters of reference, FIGS. 1–10 disclose a sun visor extension 10 for use in connection with a sun visor 12. It should be understood that while the present discussion relates to sun visor 12 having the illustrated configuration, the principles of the invention are equally applicable to other sun visor configurations.

The present invention is designed to be manufactured from cardboard material. Such material is disposable, can be recycled and is relatively inexpensive. In addition, cardboard is easy to cut and use. While other materials such as plastics could be used, a key feature of the present invention is ease of manufacture and use. Thus, cardboard is the preferred material of choice.

As best seen in FIG. 1, sun visor 12 has a visor portion 14 and a pivot point 16 which typically allows the sun visor to rotate and be positioned at any point between an out of the way up position against the roof of a vehicle and a down position which provides a maximum shading effect. In addition, pivot point 16 permits rotation of sun visor 12 from a windshield 18 to a side window 19 for protection from glare originating in either direction.

As best seen in FIGS. 2–7, sun visor extension 10 comprises a body 20 having a generally rectangular shape with two wings 22 foldably connected to and extending along opposing long sides of body 20. The width of wings 22 must be less than that body 22, preferably less than half the width of body 22 and most preferably about one eighth of an inch less wide than body 22.

In the preferred embodiment, wings 22 are folded towards each other to a juxtaposed position abutting body 20 as best seen in FIGS. 7 and 9. As best seen in FIG. 4, in this preferred embodiment, a slot 24 is created in the juxtaposed position when wings 22 are less than half the width body 20.

In addition, an open ended cavity 26 having the length and width of body 20 is created in the juxtaposed position by the positioning of wings 22 with body 20. An extension 28, seen in FIG. 2, is slidably received within cavity 26 as best seen in FIGS. 1 and 4. Extension 28 is a rectangular shape whose length corresponds to that of body 20 but with a narrower width to allow easy insertion of same into cavity 26. Extension 28, when inserted, is frictionally retained within cavity 26 by wings 22 and body 24 which abut the extension as best seen in FIGS. 4, 5 and 7.

As best seen in FIGS. 3 and 4, in the presently preferred embodiment, v-shaped notches 30 are cut into opposing short sides 32 of body 20. Corresponding diagonals 34 are cut from each corner of wings 22 opposite long side 24. When wings 22 and body 20 are in the juxtaposed position, diagonals 34 generally align with v-shaped notches 30. The combination of diagonals 34 and notches 30 allows a user to grasp both sides of extension 28 and slide extension 28 laterally in both directions. When sliding extension 28 back and forth, slot 24 provides the user with a visual gauge as to how far extension 28 has been pulled.

As best seen in FIG. 4 means for removably attaching sun visor extension 10 to sun visor 12 preferably comprise a pair of hook and loop straps 36 which wrap around the periphery of sun visor extension 10 and sun visor 12 and attached to themselves independently. Those skilled in the art will recognize that other means for attachment are possible, including, but not limited to, flexible straps.

As an alternate embodiment, a vertical extender 38 is provided which includes a mounting portion 40a and an extender portion 40b foldably joined together along a fold line 42. Vertical extender 38 has an open position wherein the extender portion 40b extends vertically downward from sun visor 12 and a closed position in which extender portion 40b is secured to mounting portion 40a. Means for detachably securing extender portion 40b to mounting portion 40a in the closed position are provided, preferably mating circular hook and loop patches 44 on each portion 40a–b. Vertical extender 38 is used only on the passenger side window since a driver's side vertical extender 38 could be a safety hazard.

As best seen in FIGS. 4 and 10, means for detachably mounting vertical extender 38 to sun visor extension 10 are provided, preferably circular hook and loop fastener patches 46a mounted on mounting portion 40a which mate with circular hook and look fastener patches 46b mounted to flaps 22. Those skilled in the art will recognize that other mounting means are possible, including, but not limited to, clips, snaps and the like.

Although only certain embodiments have been illustrated and described, it will be apparent to those skilled in the art that various changes and modifications may be made therein without departing from the spirit of the invention or from the scope of the appended claims.

What is claimed is:

1. A sun visor extension connected to an existing sun visor of a vehicle, the sun visor extension comprising:

a body having a generally rectangular shape;

two wings foldably connected to and extending along opposing long sides of the body, the width of the wings being less than that of the body, the wings adapted to be folded towards each other to a juxtaposed position abutting the body, the body and the wings creating an open ended cavity having the length and the width of body in the juxtaposed position;

a sliding extension being slidably received within the cavity, the sliding extension being a rectangular shape whose length corresponds to that of the body and whose width is narrower than that of the body, the sliding extension being frictionally retained within the cavity by the wings and the body; and means for removably attaching the sun visor extension to a sun visor.

2. The sun visor extension of claim 1 wherein each of said wings is less than half the width of the body.

3. The sun visor extension of claim 2 wherein each of said wings is about one eighth of an inch less than the width of the body.

4. The sun visor extension of claim 2 wherein a slot is created between the wings when folded in the juxtaposed position.

5. The sun visor extension of claim 4 wherein two v-shaped notches are cut into opposing short sides of the body and corresponding diagonals are cut from each corner of each of the wings, the diagonals and the v-shaped notches aligning when the wings are folded in the juxtaposed position.

6. The sun visor extension of claim 1 wherein the means for removably attaching comprises a pair of hook and loop straps adapted to be wrapped around the periphery of the sun visor extension and a sun visor, each of the pair of hook and loop straps attaching to itself.

7. The sun visor extension of claim 1 wherein the means for removably attaching comprises a flexible straps adapted to be wrapped around the periphery of the sun visor extension and a sun visor.

8. The sun visor extension of claim 1 further comprising:

a vertical extender having a mounting portion and an extender portion foldably joined together along a fold line, the vertical extender having an open position in which the extender portion extends vertically downward from the sun visor extension and a closed position when the extender portion is secured to the mounting portion;

means for detachably securing the mounting portion to the extender portion in the closed position; and means for detachably mounting vertical extender to the sun visor extension.

9. The sun visor extension of claim 8 wherein the means for detachably securing the mounting portion to the extender portion comprises mating hook and loop patches.

10. The sun visor extension of claim 8 wherein the means for detachably mounting the vertical extender to the sun visor extender comprises mating hook and loop patches.

11. A sun visor extension connected to an existing sun visor of a vehicle, the sun visor extension comprising:

a body having a generally rectangular shape;

two wings foldably connected to and extending along opposing long sides of the body, the width of the wings being less than half the width of the body, the wings adapted to be folded towards each other to a juxtaposed position abutting the body, the body and the wings creating an open ended cavity having the length and the width of body in the juxtaposed position, a slot being created between the wings in the juxtaposed position, two v-shaped notches being cut into opposing short sides of the body and corresponding diagonals are cut from each corner of each of the wings, the diagonals and the v-shaped notches aligning when in the juxtaposed position;

a sliding extension being slidably received within the cavity, the sliding extension being a rectangular shape whose length corresponds to that of the body and whose width is narrower than that of the body, the sliding extension being frictionally retained within the cavity by the wings and the body;

a pair of hook and loop straps for removably attaching adapted to be wrapped around the periphery of the sun visor extension and a sun visor, each of the pair of hook and loop straps attaching to itself;

a vertical extender having a mounting portion and an extender portion foldably joined together along a fold line, the vertical extender having an open position in which the extender portion extends vertically downward from the sun visor extension and a closed position when the extender portion is secured to the mounting portion;

mating hook and loop patches for detachably securing the mounting portion to the extender portion in the closed position; and mating hook and loop patches for detachably mounting vertical extender to the sun visor extension.

12. The sun visor extension of claim 11 wherein each of said wings is about one eighth of an inch less than the width of the body.

\* \* \* \* \*